(12) United States Patent  
Cantrell et al.

(10) Patent No.: US 9,103,086 B2  
(45) Date of Patent: Aug. 11, 2015

(54) OPEN WATER OIL SKIMMER

(71) Applicants: Jeff Cantrell, Crossville, IL (US); Paul Smith, Mill Creek, WA (US); Justin Morgan, Seattle, WA (US)

(72) Inventors: Jeff Cantrell, Crossville, IL (US); Paul Smith, Mill Creek, WA (US); Justin Morgan, Seattle, WA (US)

( * ) Notice: Subject to any disclaimer, the term of this patent is extended or adjusted under 35 U.S.C. 154(b) by 218 days.

(21) Appl. No.: 13/712,121

(22) Filed: Dec. 12, 2012

(65) Prior Publication Data

US 2014/0158603 A1 Jun. 12, 2014

(51) Int. Cl.
| | |
|---|---|
| *E02B 15/04* | (2006.01) |
| *B63B 35/32* | (2006.01) |
| *B01D 21/00* | (2006.01) |
| *E02B 15/10* | (2006.01) |
| *C02F 1/40* | (2006.01) |
| *C02F 101/32* | (2006.01) |
| *C02F 103/00* | (2006.01) |
| *C02F 103/08* | (2006.01) |

(52) U.S. Cl.
CPC .......... *E02B 15/048* (2013.01); *B01D 21/0027* (2013.01); *B63B 35/32* (2013.01); *E02B 15/046* (2013.01); *B63B 2207/02* (2013.01); *C02F 1/40* (2013.01); *C02F 2101/32* (2013.01); *C02F 2103/007* (2013.01); *C02F 2103/08* (2013.01); *E02B 15/102* (2013.01)

(58) Field of Classification Search
CPC ..... E02B 15/046; E02B 15/048; E02B 15/10; E02B 15/102; E02B 15/103; B63B 35/32

USPC .............. 210/170.05, 170.09, 170.11, 242.3, 210/747.6, 776, 923

See application file for complete search history.

(56) References Cited

U.S. PATENT DOCUMENTS

| | | | | |
|---|---|---|---|---|
| 3,615,017 | A * | 10/1971 | Valdespino | 210/242.3 |
| 3,823,828 | A * | 7/1974 | Derzhavets et al. | 210/242.3 |
| 3,860,519 | A * | 1/1975 | Weatherford | 210/242.3 |
| 3,884,807 | A * | 5/1975 | Heddon | 210/923 |
| 3,966,615 | A * | 6/1976 | Petchul et al. | 210/923 |
| 4,360,429 | A * | 11/1982 | Morris | 210/242.3 |
| 4,851,133 | A * | 7/1989 | Rymal | 210/242.3 |
| 5,215,654 | A * | 6/1993 | Karterman | 210/242.3 |
| 5,685,979 | A * | 11/1997 | Governale | 210/242.3 |
| 7,410,577 | B2 * | 8/2008 | Broje | 210/242.3 |
| 2009/0206043 | A1 * | 8/2009 | Haagensen et al. | 210/170.05 |
| 2011/0303616 | A1 * | 12/2011 | Cox et al. | 210/170.05 |

* cited by examiner

*Primary Examiner* — Christopher Upton  
(74) *Attorney, Agent, or Firm* — Gary K. Price

(57) ABSTRACT

An oil spill skimmer for removing heavy hydrocarbons from bodies of water, having a plurality of oleophilic oil separation devices, a housing and frame structure that is suitably supported above a body of water, an adjustable wave damper supported by the housing at a front of the skimmer, an at least one flow inducer supported by the housing at a rear of the skimmer, and ballast-adjustable tanks. The at least one flow inducer for inducing inflow such that water is pulled at the front of the skimmer and directed out a bottom of the skimmer while collecting the spillage in a collection area. The ballast can be moved in and out of the tanks to increase or decrease buoyancy and influence the wave riding or wave heave of the skimmer.

15 Claims, 5 Drawing Sheets

OPEN WATER OIL SKIMMER

CROSS REFERENCES TO RELATED APPLICATIONS

U.S. Provisional Application for Patent No. 61/576,734, filed Dec. 16, 2011, with title "Open Water Oil Skimmer" which is hereby incorporated by reference. Applicant claims priority pursuant to 35 U.S.C. Par. 119(e)(i).

Statement as to rights to inventions made under federally sponsored research and development: Not Applicable

BACKGROUND OF THE INVENTION

1. Field of the Invention

The present invention relates to oil spill recovery, and more particularly to large scale, offshore and nearshore oil spill skimming equipment capable of high volume recovery of oil in the open sea, regardless of weather conditions.

2. Brief Description of Prior Art

For many years, crude oil and refined hydrocarbon product spillages at sea have been a problem. The environmental damage and clean up costs of large spills can present a serious problem for the industries involved. As more crude oil and refined hydrocarbon products are being transported over longer distances by large tankers, and with the increase in off shore hydrocarbon exploration and production, the problem of dealing with spillages is likely to increase. As such, a method and apparatus is needed for reliably removing the spillages as rapidly as possible from the surface of the water in open seas.

Slicks in the open sea vary considerably in their characteristics depending upon the type of crude oil or refined hydrocarbon products spilled, the weather, size of the spillage and the condition of the sea. When compared with the problems of recovering spillages in quiet, calm seas, bays, harbors or rivers, the recovery of spillages in the open sea, particularly under adverse weather conditions, is clearly more difficult. Frequently in the past, many types of spillage recovery equipment have only been effective in relatively calm conditions and were intended for short term operation.

To date, many types of methods and apparatus have been used in attempts to deal with spillages. Most of the presently-known equipment is of marginal use in harbors or relatively protected waters but is ineffective on the high seas. Even in calm water, the prior art can be marginal at best.

As will be seen from the subsequent description, the preferred embodiments of the present invention overcome shortcomings of the prior art.

SUMMARY OF THE INVENTION

Briefly stated, the present invention is directed to an oil spill response technique for removing spilled hydrocarbons from bodies of water. The oil spill skimmer is an adhesion skimmer having a plurality of oleophilic oil separation devices. The skimmer further includes a housing and frame structure that is suitably supported above a body of water.

An adjustable wave damper supported by the housing and frame structure is arranged at a front of the skimmer. The wave damper includes adjustable means to position the damper in an upwardly direction, a downwardly direction, and/or on a positive or negative slope in order to accommodate the various weather and sea conditions. The skimmer further includes at least one induction pump that is supported by the housing and frame structure at a rear of the skimmer. The at least one induction pump induces inflow such that water is pulled at the front of the skimmer and is then directed into a oil collection area of the skimmer, out a bottom of the skimmer while collecting the spillage in the collection area. The skimmer further includes ballast-adjustable tanks supported by the housing and frame structure. The ballast, preferably water, can be moved in and out of the tanks to increase or decrease buoyancy and influence the wave riding or wave heave of the skimmer.

DESCRIPTION OF THE PREFERRED EMBODIMENT

Figure 1:
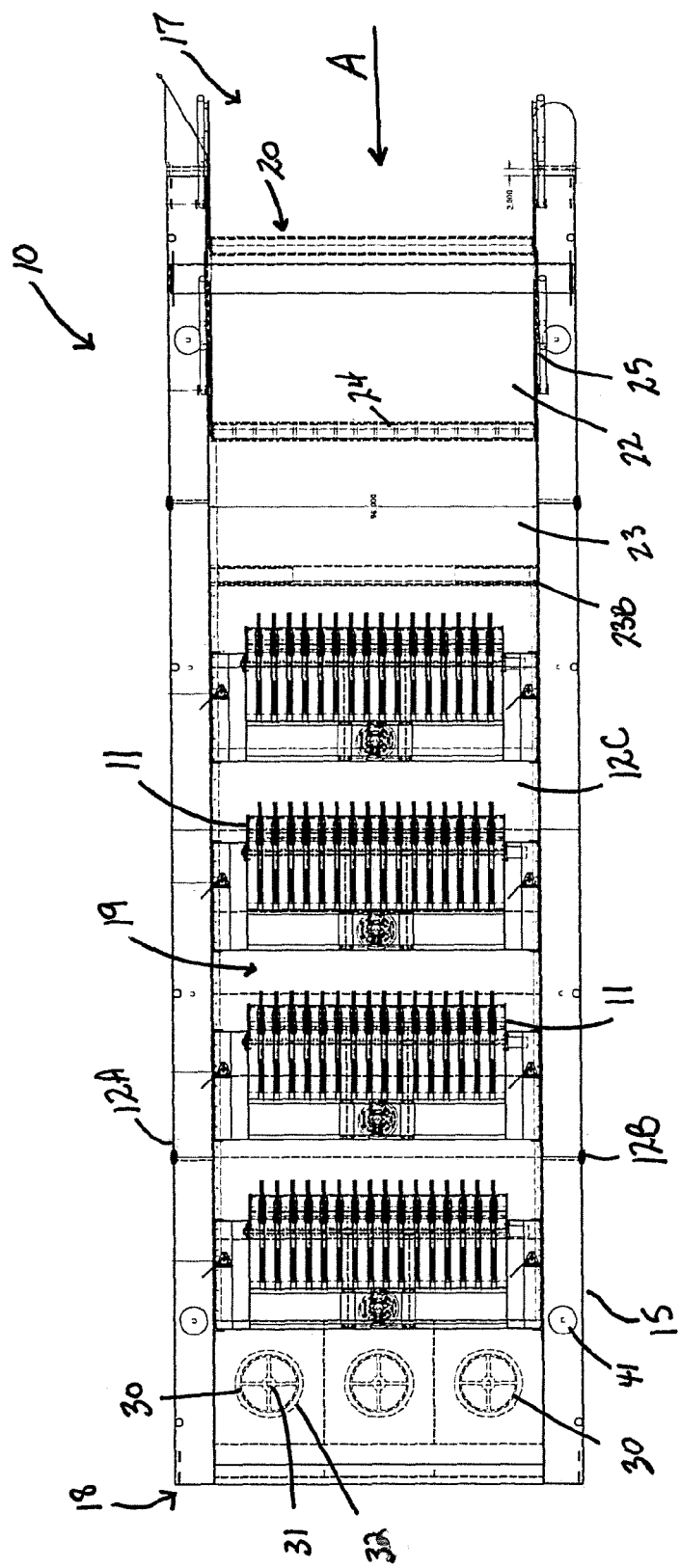
FIG. 1 is a top plan view of a preferred embodiment of the present invention, an oil spill skimmer.
Figure 2:
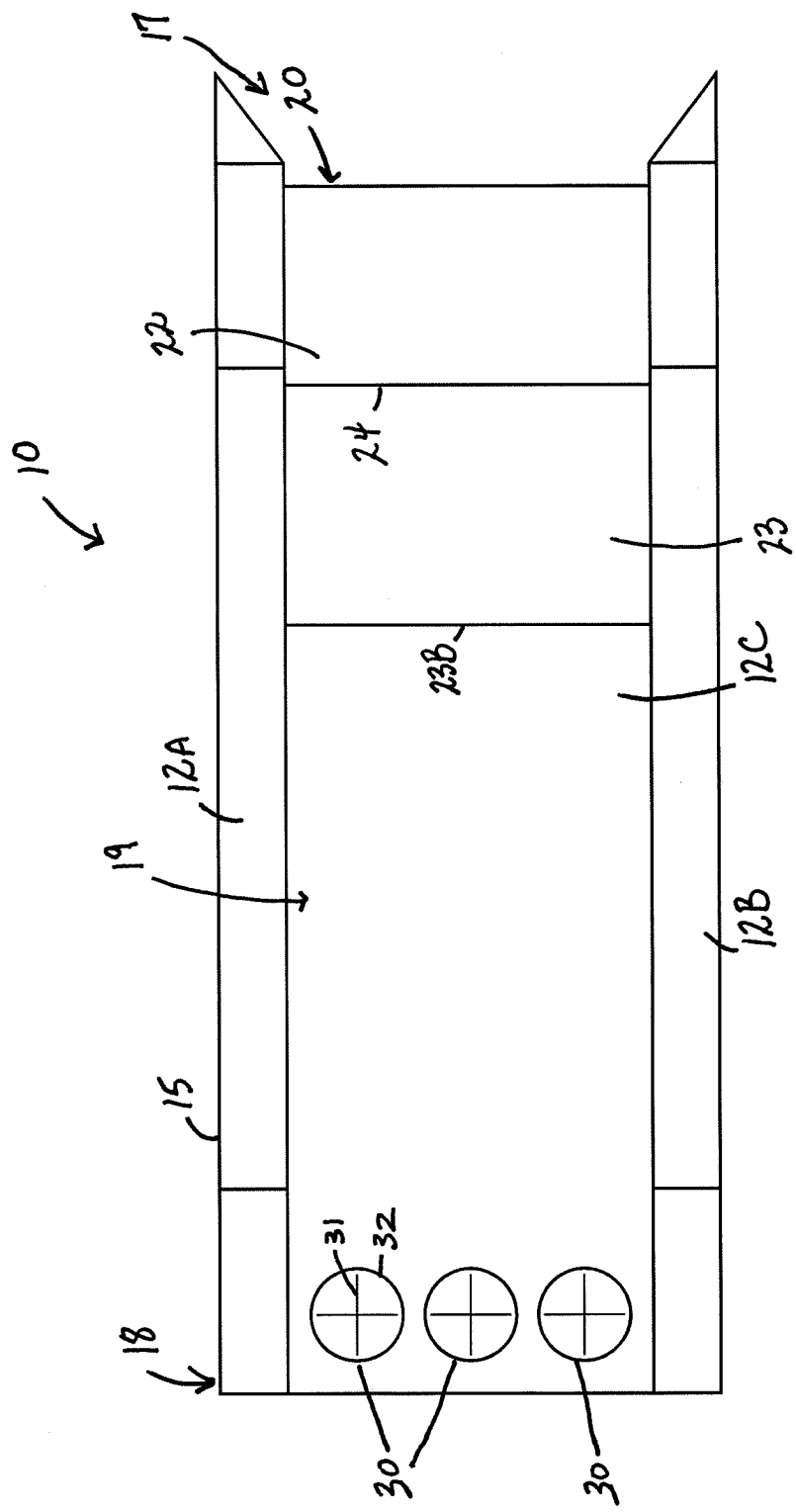
FIG. 2 is the oil spill skimmer of FIG. 1 with the plurality of oil separation devices removed.
Figure 3:
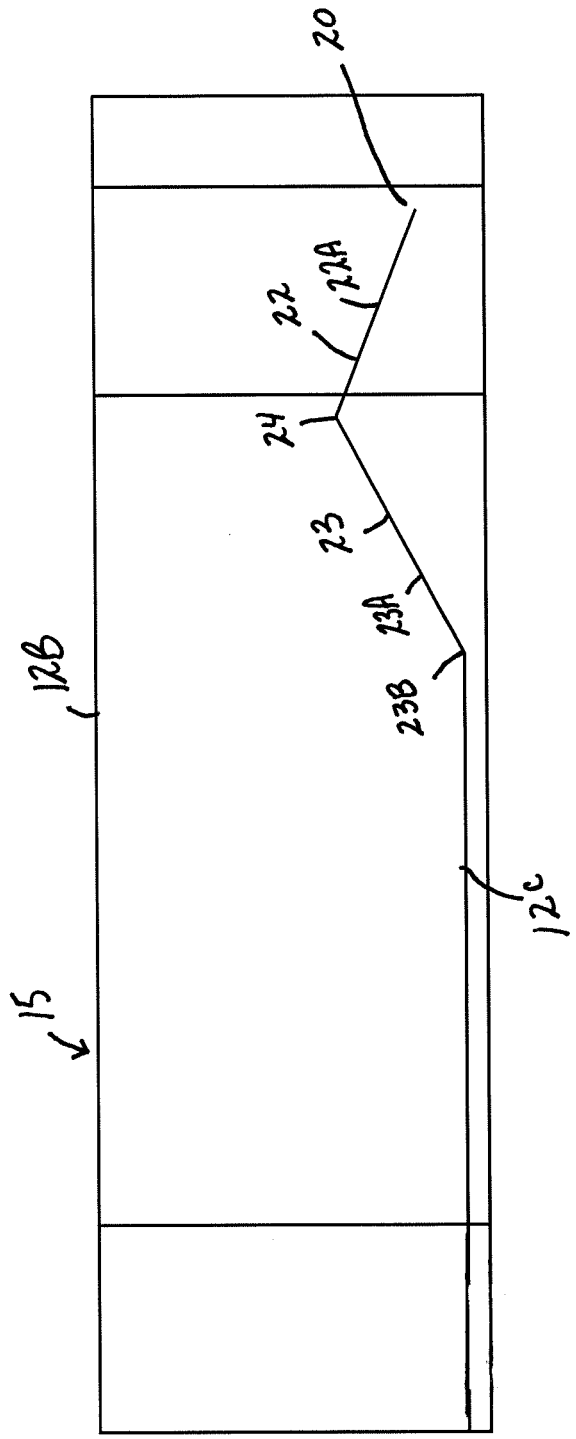
FIG. 3 is a side view of the oil spill skimmer.

In accordance with the present invention, a novel and improved oil spill skimmer is disclosed. The skimmer of the present invention designed for large scale, offshore oil spill skimming capable of high volume recovery of oil in the open sea, regardless of weather conditions. More particularly, the described equipment relates to an oil spill response technique used to readily remove spilled hydrocarbons from bodies of water. In the broadest context, the oil spill skimmer equipment of the present invention consists of components configured with respect to each other so as to attain the desired objective.

The present invention is now exemplified by a particular embodiment which is illustrated in the accompanying drawings.

The oil spill skimmer of this application is shown generally designated as numeral 10. The skimmer 10 has certain features that are well known in the art and as such those features will not be described here. In this embodiment, the skimmer 10 is primarily directed to a forward motion unit having a flowing body of water moving therethrough; however, as will be understood, the skimmer 10 is capable of oil spill skimming while stationary, or, while advancing in the open sea.

As illustrated, the skimmer 10 is an adhesion skimmer having a plurality of oleophilic oil separation devices 11 such as rotatable fluid recovery discs having a pattern of grooves as disclosed in U.S. Pat. No. 7,410,577 which is incorporated herein by reference.

The skimmer 10 further includes a housing and frame structure 15 that defines first and second sides 12A, 12B, respectively, and lower member 12C of the skimmer 10. In use the housing and frame structure 15 is suitably supported above a body of water (not shown).

According to the present invention, the skimmer 10 is moved over the water surface (not shown) in order to clear the water surface. Waves are naturally occurring on the water surface as a result of a sea swell and local wind. When the skimmer 10 is moved over the water surface, the waves are calmed by means of at least one wave damper 20 of the skimmer 10. The wave damper 20 is supported by the housing and frame structure 15 and is arranged at a front, open end 17 of the skimmer 10. The open end 17 permits water to freely pass between the sides 12A, 12B of the skimmer into the collection area 19 of the skimmer 10.

In the preferred embodiment the wave damper 20 includes adjustable means 25 that is selectively positioned in order to calm the waves. In this regard, the damper 20 is a movable wave damper which intercepts, and damps the movement of the water with the particles which are to be separated. These measures for calming the waves on the water surface as described allow the water surface to be cleaned even in the case of higher seas and while the skimmer 10 is advancing in the open sea. As will be further discussed, the water surface can then be cleaned more quickly than is the case with known oil-spill clearance vessels, since the present skimmer 10 is operable while advancing.

The wave damper's adjustable means 25 includes positioning the damper 20 in an upwardly direction, a downwardly direction, and/or on a positive or negative slope in order to accommodate the various weather and sea conditions. Any suitable mechanism may be used to position the damper 20 as described.

The wave damper 20 defines a two-part adjustable weir which intercepts, and damps the movement of the water with the particles which are to be separated, resulting in the dissipation of wave energy, exclusion and redirection of excess water and reduction of flow velocity.

The waves lose considerable energy against the dampers 20 and the oil works its way into the collection area 19 for collection in the normal manner. The wave damper 20 includes a first member 22 that has an upwardly sloping surface 22A disposed at the front open end 17 of the skimmer 10. The first member 22 encourages incoming waves to break before they enter the collection area of the skimmer 10. The wave damper 20 further defines a second member 23 having a downwardly sloping plate 23A and disposed behind the upwardly sloping plate 22A. The second member 23 hinged 23B to the lower member 12C. The second member 23 provides a divergent channel and reduces flow velocity. As illustrated, the first member 22 and second member 23 are attached at apex 24.

The wave damper 20 as described for calming the waves on the water surface and particularly the waves directed towards the front, open end 17 of the skimmer 10, allows the water surface to be cleaned even in the case of higher seas and wave heights which are not available in operating conditions for known oil-spill clearance vessels.

The skimmer 10 further includes at least one induction pump 30 that is supported by the housing and frame structure 15 at a rear 18 of the skimmer 10. The at least one pump 30 creates flow through the skimmer 10, and is positioned at the rear 18 of the skimmer 10 to induce inflow, in a direction illustrated schematically by means of arrow A in FIG. 1, whether floatage to be removed or the liquid spillage being skimmed, for helping direct the inflow into the collection area 19 of the skimmer 10. More particularly, the at least one pump 30 pulls water at the front, opened 17 of the skimmer 10 and water is then directed into the oil collection area 19 of the skimmer 10, and out a bottom (not shown) of the skimmer 10 (direction A) while collecting the spillage in collection area 19. The resulting flow of particles into the collection area 19 as described, which collection area 19 is that area defined between the sides 12A, 12B of the skimmer 10 and the lower member 12C, and is in communication with the plurality of oil separators 11. In the collection area 19, separation of the flow takes place essentially as the flow is directed and guided into the collection area 19 in direct communication with the plurality of oil separators 11. In order to optimize the flow separation, the at least one induction pumps 30 in effect pulls the liquid spillage being skimmed into the collection area 19, and further induces current thereby improving the reach of the skimmer 10 to draw larger quantities of water into the collection area 19 so that the oil separators 11 can separate the floating oil from the water.

Each of the at least one induction pumps 30 generally include a propeller 31 disposed in an open tube 32 such that the rotation of the propeller acts as a pump and creates an artificial current that is slightly faster than the speed of the skimmer 10 advancing in the open sea. The artificial current inviting water and oil to come in through the open bow 17.

While it is known that the plurality of oil separators 11 will induce a slight surface current that can draw oil and water to the separators 11 when operating in stationary mode rather than advancing through the water, such slight induced current has limited reach. Assisting the natural, oil separators 11 pumping with the at least one induction pumps 30 induces more current thereby drawing larger quantities of water into the collection area 19 so that the oil separators 11 can separate the floating oil from the water. As such, whether the oil separators 11 are engaged or not, the at least one induction pump 30 can be used to draw water and floating oil into the collection area 19.

In the preferred embodiment, once the oil is in the collection area, the oil separators 11 are activated to separate and remove the oil.

When the skimmer is "at rest", i.e., the skimmer is not advancing, the wave damper 20 is preferably not in application, however, the at least one induction pump 30 continues to create flow through the skimmer and direct the inflow into the collection area 19 of the skimmer 10, for collecting the spillage in collection area 19.

Ballast-adjustable tanks 40 are further disposed in the housing and frame structure 15 of the skimmer 10. The ballast, preferably water, can be moved in and out of the tanks 40 to increase or decrease ballast, i.e. increase or decrease buoyancy and influence the wave riding or wave heave of the skimmer 10.

Figure 4:
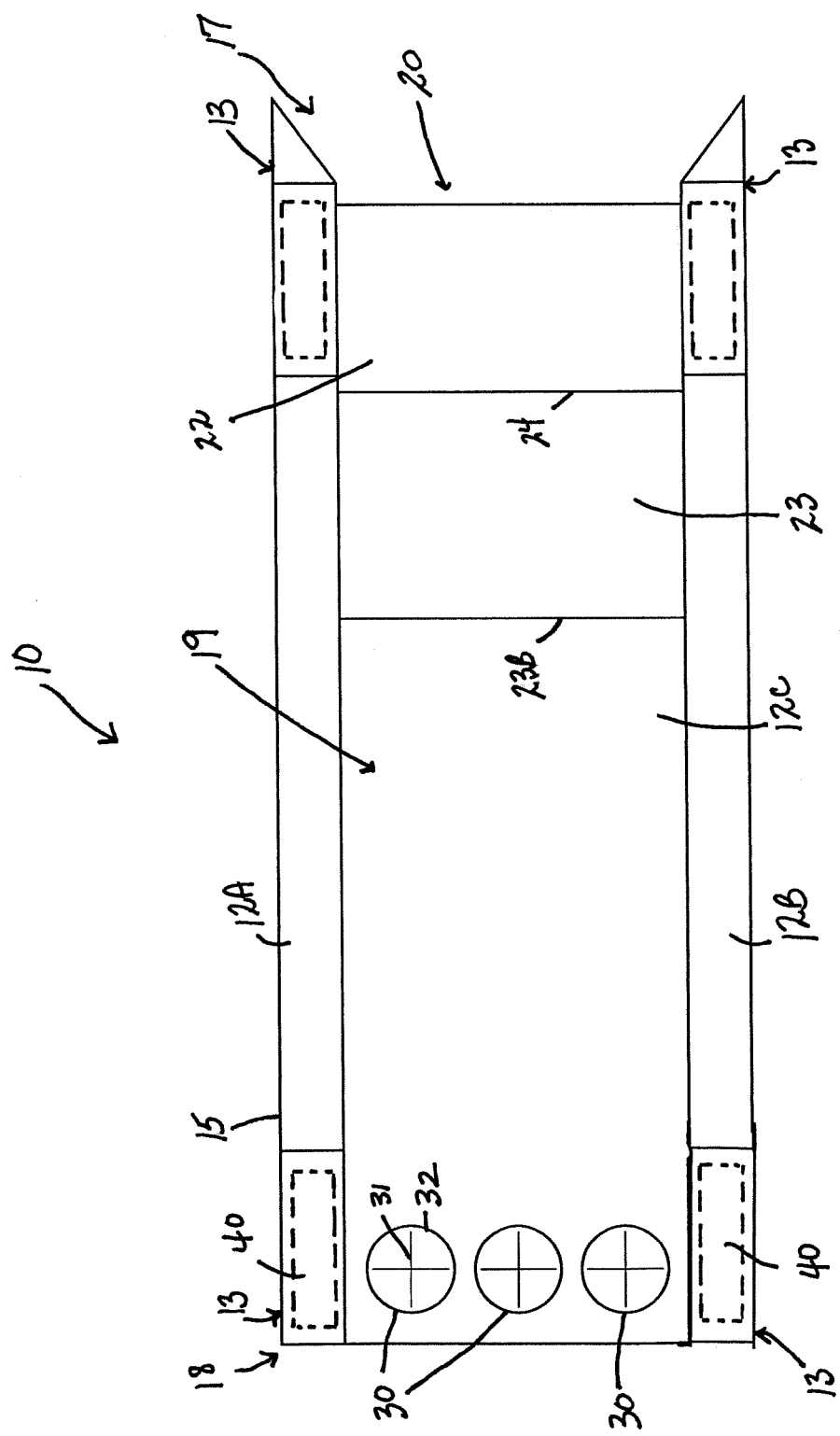
FIG. 4 is a top plan view of the device of FIG. 2 exemplifying a location for the ballast-adjustable tanks in broken lines.
Figure 5:
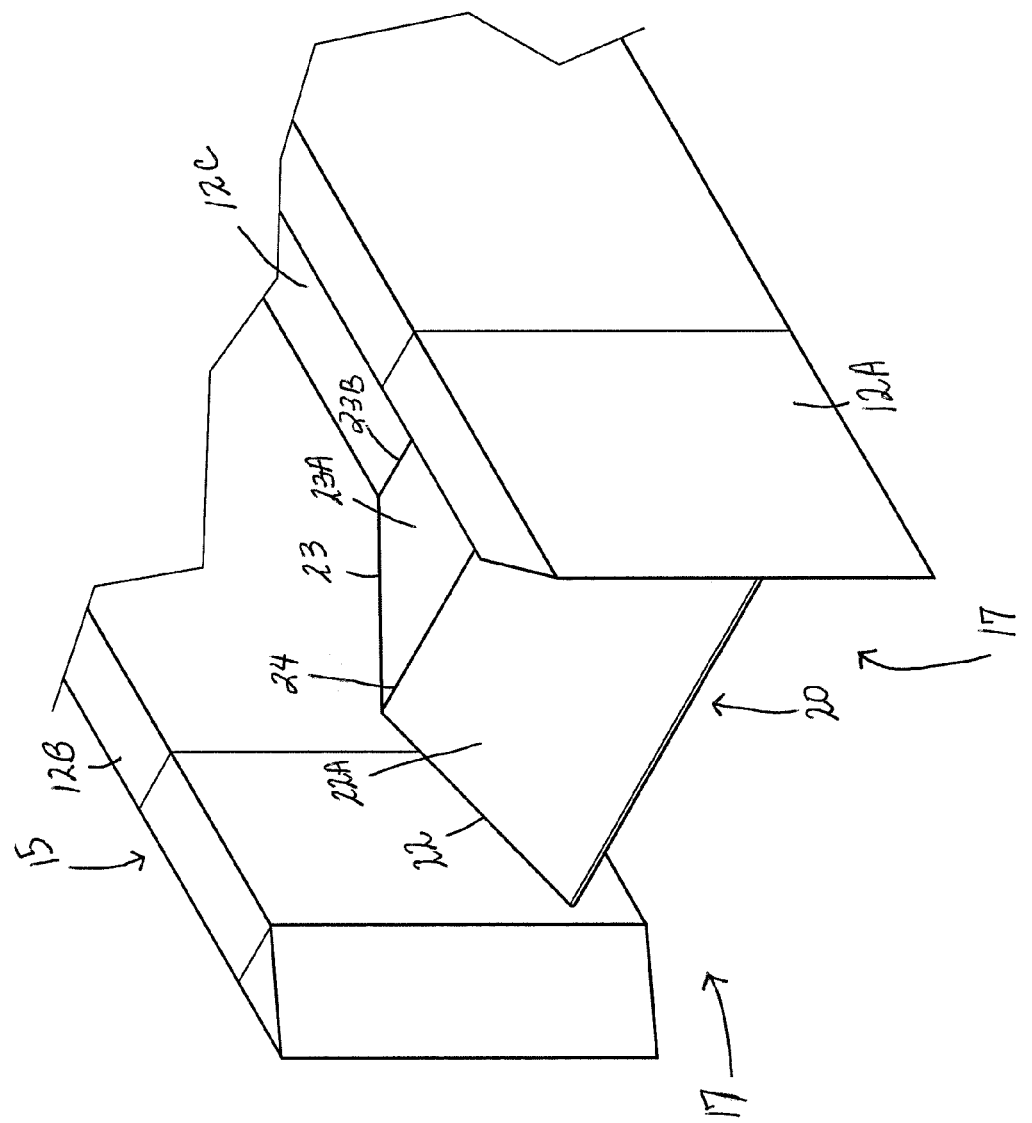
FIG. 5 is a partial view of the oil spill skimmer illustrating the open bow and wave damper.

The ballast-adjustable tanks 40 (FIG. 4) further include ballast control means 41 (FIG. 1) so as to enable control of the height and attitude of the skimmer 10. In the preferred embodiment, the tanks 40 are disposed substantially to the bottom sections of the sides 12A, 12B to improve heave performance. Further, adding ballast at the approximate ends 13 of the skimmer 10 makes it stiffer in pitch. The ballast tanks allow the attitude of the skimmer 10 to be adjusted in the water so that the most advantageous deck profile is presented to the particular wind-wave situation of the moment.

The ballast tanks 40 are preferably in communication with a suitable source of water so that their relative buoyancy may be controlled during application, as for example in the event of substantially high waves, the increased buoyancy in the tanks 40 will elevate the entire skimmer 10 relative to the wave action and insure the effectiveness of the discs 11 in providing a relatively calm area in the area defined in the collection area 19, where the discs 11 are operable.

As should be understood, the skimmer 10 needs to have good seakeeping characteristics to enable the oil separators 11 to perform. Adding ballast-adjustable tanks 40 improves the skimmer's 10 heave performance, that is the up and down motion or wave-following. Further, using water ballast is preferred since the skimmer 10 is designed to be transported to a spill site and launched and retrieved from the water. As such, it is necessary that the skimmer 10 be capable of a heavy, working platform during application, while being light-weight for purposes of transport. The ballast-adjustable tanks 40 of the present invention accomplish this since when the tanks 40 are empty, the skimmer 10 is suitable for transport, and during application, increasing or decreasing ballast will influence the wave riding or wave heave of the skimmer 10.

Although the description above contains many specificities, these should not be construed as limiting the scope of the invention but as merely providing illustrations of some of the presently preferred embodiments of this invention. Thus the scope of the invention should be determined by the appended claims in the formal application and their legal equivalents, rather than by the examples given.

We claim:

1. An oil spill skimmer for separating and removing spilled hydrocarbons from bodies of water, said oil spill skimmer comprising:
   a structure for moving over the water surface, said structure having a front, open end, first and second sides that each define opposite ends, and a lower member,
   a collection area defined by said first and second sides, said lower member, and a plurality of oleophilic oil separation devices,
   a wave damper disposed below the water surface and supported by said structure and disposed on said front, open end, wherein said wave damper includes adjustable means for selectively positioning, said wave damper configured to calm waves on the water surface,
   at least one flow inducer supported by said structure and vertically disposed at a rear of said structure and downwardly extends to a lower most surface, said at least one flow inducer configured for inducing a flow of water and spillage into the front, open end and into the collection area while the structure is at rest, and
   adjustable ballast tanks separately disposed on each of the opposite ends of said first and second sides and configured for increasing and decreasing buoyancy of the structure, said adjustable ballast tanks including ballast control means for enabling an operator to add or remove ballast from the at least one ballast tank as desired.

2. The oil spill skimmer as recited in claim 1, wherein said wave damper comprising a first member connected to a second member such that said second member is positioned behind said first member.

3. The oil spill skimmer as recited in claim 2, wherein said first member having an upwardly sloping surface.

4. The oil spill skimmer as recited in claim 3, wherein said second member having a downwardly sloping surface.

5. The oil spill skimmer as recited in claim 1, wherein said at least one flow inducer induces a current into said collection area that is slightly greater than a speed of the structure while the structure is advancing.

6. The oil spill skimmer as recited in claim 1, wherein said at least one adjustable ballast tank is disposed at a bottom of said structure.

7. An oil spill skimmer for separating and removing spilled hydrocarbons from bodies of water, said oil spill skimmer comprising:
   a structure having first and second sides and a front, open end for receiving liquid and spillage being skimmed,
   a plurality of oil separators,
   at least one flow inducer vertically disposed at a rear of the structure, opposite said front, open end, and downwardly extending to a lower member of said structure, said at least one flow inducer configured to create a flow of water through the structure while the structure is at rest by pulling the flow of the liquid and spillage from the front, open end to a collection area at a rear end of the structure, wherein said collection area disposed between said first and second sides, said lower member and said plurality of oil separators, each of said at least one flow inducers including a propeller within an open tube, said propeller approximately adjacent said collection area,
   adjustable ballast tanks separately disposed substantially at bottom sections on opposite ends of each of said first and second sides and, said adjustable ballast tanks including ballast control means for enabling an operator to add or remove ballast from said ballast tanks as desired, and wherein said ballast is water.

8. The oil spill skimmer as recited in claim 7, further including a wave damper supported by said structure and disposed on said front, open end, wherein said wave damper includes adjustable means for selectively positioning said damper.

9. The oil spill skimmer as recited in claim 8, wherein said wave damper comprising a first member connected to a second member, and wherein said second member is disposed behind said first member.

10. The oil spill skimmer as recited in claim 9, wherein said first member having an upwardly sloping surface.

11. The oil spill skimmer as recited in claim 10, wherein said second member having a downwardly sloping surface.

12. The oil spill skimmer as recited in claim 11, wherein said oil spill skimmer is advancing over the body of water.

13. The oil spill skimmer as recited in claim 7, wherein said at least one flow inducer pulls a current into said collection area that is slightly greater than a speed of the structure while the structure is advancing.

14. An oil spill skimmer for separating and removing spilled hydrocarbons from bodies of water, said oil spill skimmer comprising:
   a structure advancing in a first direction having a flowing body of water moving therethrough in a second direction opposite said first direction,
   a plurality of oil separators in communication with said flowing body of water,
   a wave damper supported on first and second sides of said structure, said wave damper disposed at a front, open end of said structure and defining an upwardly sloping surface disposed at the front, open end, and a downwardly sloping surface disposed behind the upwardly sloping surface, wherein the upwardly sloping surface and the downwardly sloping surface are attached at an apex,
   at least one flow inducer downwardly disposed in said structure such that a propeller at a lower most end of each of said at least one flow inducers is adjacent a collection area, said at least one flow inducer for pulling a flow of water into the front, open end and into said collection area while the structure is at rest,
   a said collection area defined between said first and second sides and in fluid communication with said plurality of oil separators,
   adjustable ballast tanks separately disposed at approximate ends of each of said first and second sides.

15. The oil spill skimmer as recited in claim 14, wherein said adjustable ballast tanks include ballast control means for enabling an operator to add or remove ballast from said ballast tanks as desired.

* * * * *